INVENTOR
ROBERT J. GREENLER
BY
ATTORNEYS

United States Patent Office 3,625,668
Patented Dec. 7, 1971

3,625,668
DEVICE FOR TRAPPING AND REMOVING GAS
BUBBLES FROM A GLASS MANUFACTURING
CHAMBER
Robert J. Greenler, Monroe, Mich., assignor to
Ford Motor Company, Dearborn, Mich.
Filed May 15, 1970, Ser. No. 37,794
Int. Cl. C03b 18/02
U.S. Cl. 65—182 R
9 Claims

ABSTRACT OF THE DISCLOSURE

A glass manufacturing chamber contains a refractory ceramic lining which supports thereon a molten bath over which glass may be floated to form a ribbon of glass. A device for trapping and removing gas bubbles from the chamber includes a block of material nonreactive with the molten bath and any atmosphere contained within the chamber. The block has a first portion submerged in the molten bath at a position located above a portion of the refractory ceramic lining. The first portion of the block has a plurality of gas receiving pockets formed therein which face the refractory ceramic lining. The block of material also has a second portion to which the first portion is connected. The second portion of the block has gas collecting and gas venting openings formed therein which are interconnected with the gas receiving pockets formed in the first portion of the block. Any gas issuing from the refractory lining is caught by the gas receiving pockets and then vented through the gas collecting and gas venting openings formed in the second portion of the block.

BACKGROUND OF THE INVENTION

In the recent past, a new approach to manufacturing sheet glass has been undertaken. In this approach, molten glass is poured out on a molten bath and floated thereover to form a ribbon of glass. The molten bath over which the glass is floated is confined in a chamber and is supported in the chamber by means of a refractory ceramic lining. The space above the molten bath contains an atmosphere which protects the glass and the molten material forming the bath.

In operation of such a glass manufacturing chamber, occasional gas bubbles will form in the refractory ceramic lining. These bubbles will pass upwardly through the molten bath and come into engagement with the underside of the glass ribbon floating upon the bath. Engagement of the ribbon by such bubbles causes depressions in the ribbon of glass. Subsequently, those portions of the ribbon of glass containing the depressions must be scrapped. Various systems and apparatus have been proposed and utilized for eliminating or reducing the gas bubbling which occurs in a float glass manufacturing chamber. While these various systems and apparatus have met with success, the device of this invention has been brought forth to supplement and/or to replace such systems as are already known in the art.

SUMMARY OF THE INVENTION

This invention relates to a device for trapping and removing gas bubbles and, more particularly, to a device for trapping and removing gas bubbles from a chamber utilized in the manufacture of glass. The glass manufacturing chamber is one which contains at least a refractory ceramic lining which supports thereon a molten bath over which glass may be floated to form a ribbon of glass.

The device for trapping and removing gas bubbles in accordance with this invention includes the following. A block of material which is substantially nonreactive with the molten bath and any atmosphere contained within the chamber is formed so as to have a first portion and a second portion. The first portion of the block of material is submerged in the molten bath at a position located above a portion of the refractory ceramic lining. The first portion of the block has a plurality of gas receiving pockets formed therein which face the refractory ceramic lining when the block is in its submerged position. The second portion of the block has gas collecting and gas venting openings formed therein which are interconnected with the gas receiving pockets formed in the first portion of the block. Gas bubbles evolved by the refractory ceramic lining underneath the block are caught in the gas receiving pockets of the first portion of the block and directed to the gas collecting and venting openings. The gas venting openings direct the gas into the atmosphere space above the molten bath of the chamber.

DESCRIPTION OF THE PREFERRED EMBODIMENT

Figure 1:
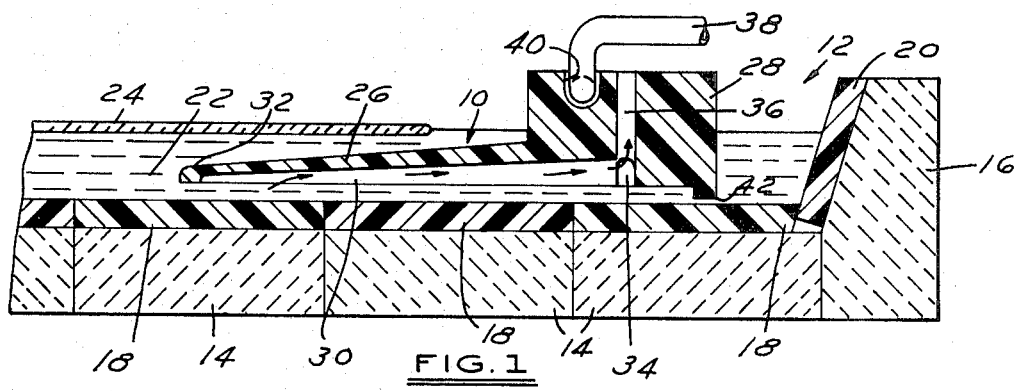
FIG. 1 is a cross sectional view showing the gas trapping and removing device of this invention in a position installed within the interior of a glass manufacturing chamber.

The gas trapping and removing device of this invention is shown in cross section in FIG. 1 and is generally identified by the numeral 10. The device is employed in a glass processing chamber, a portion of which is shown in FIG. 1. The glass processing chamber is generally identified by the numeral 12. This chamber is defined at least in part by a plurality of refractory ceramic bottom blocks 14. The chamber is also defined in part by refractory side blocks 16 formed from a ceramic material. Bottom graphite liner blocks 18 may also be employed in the chamber for the purpose known to those skilled in the art. Similarly, side graphite liner blocks 20 may be employed in the chamber in order to obtain the desired benefits known to those skilled in the art. It should be understood, however, that the device of this invention may be utilized in a glass processing chamber which does or does not have the graphite liner blocks 18 and 20. In either case, the beneficial advantages of the utilization of the device of this invention are obtained.

The refractory and graphite liner blocks 14, 16, 18 and 20, respectively, define a cavity for containing a molten bath of material 22. In general, the bath material 22 is molten tin. Over the molten tin a ribbon of glass 24 is floated so as to produce a glass ribbon of uniform thickness and high optical qualities.

In general, it has been found that in the hotter portions of the float glass processing chamber, that is, the portions of the chamber in which the glass ribbon is flowed out to a desired thickness, the refractory ceramic material tends to produce small or tiny gas bubbles. These small gas bubbles drift upwardly through the joints between the bottom graphite liner blocks 18 and upwardly through the molten bath material 22. In many cases, the bubbles come into contact with the underside of the glass ribbon 24 floating on the molten bath 22. When the underside of the glass ribbon is engaged by the tiny bubbles, small indentations are left in the glass ribbon subsequently causing such portions of the ribbon to be scrapped because of its imperfect surface quality.

The gas trapping and venting device of this invention is designed to catch the small gas bubbles evolving from the refractory ceramic material when it is degassing. The device takes the gas bubbles from underneath the glass ribbon before they engage the ribbon and diverts them to a location where the bubbles may be discharged to the atmosphere confined above the molten bath.

In greater detail, the gas trapping and removing device 10 of this invention is formed of a first portion 26 and a second portion 28. In the preferred construction, the device 10 is formed of a material which is both not attacked by the material forming the bath 22 and not attacked by the atmosphere confined within the chamber. For example, when the molten bath material is tin, and a nonoxidizing atmosphere is utilized in the chamber, a graphite slab may be utilized to form the device. In this regard, a unitary piece of graphite may be utilized to form both the first portion and the second portion of the device.

Figure 2:
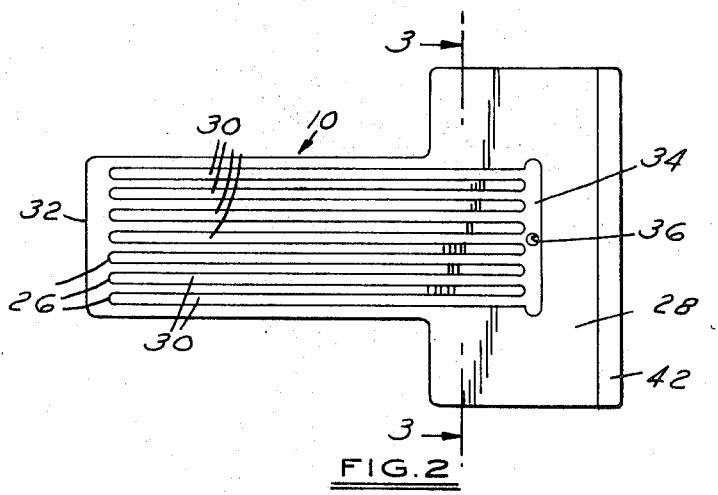
FIG. 2 is a plan view of the bottom of the gas trapping and removing device.
Figure 3:
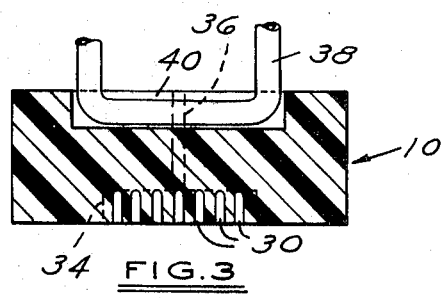
FIG. 3 is a cross sectional view of the gas trapping device taken along line 3—3 of FIG. 2.

With reference to FIGS. 2 and 3, the underside of the first portion 26 of the gas trapping and removing device 10 is formed so as to have a plurality of gas receiving pockets 30 therein. Also, the first portion of the block is formed so its upper surface tapers downwardly from the point of joinder with the second portion 28 of the block to the free end 32 thereof. The plurality of gas receiving pockets 30 are in the form of a plurality of aligned grooves, the upper surfaces of which are semicircular in form and inclined upwardly towards the second portion of the device 10. This construction of the device may best be seen in FIG. 1.

The plurality of gas receiving pockets 30 terminate at their upper end in a gas collecting opening 34. The gas collecting opening 34 is, in turn, connected to a gas venting opening 36. The gas venting opening is an opening through the second portion of the device 10 to the free space above the molten bath 22. The chamber is so designed that the free space above the bath 22 is filled with a protective atmosphere and it is into this atmosphere that the gas bubbles are vented.

As shown in FIG. 1, the gas trapping and removing device 10 of this invention is supported in the bath by means of a balance system. More particularly, a water cooled pipe 38, supported at its free ends by means not shown, is positioned in an opening 40 about which the device is balanced. The pressure applied downwardly on the device by the pipe holds it in position against the upward pressure applied on the device by the molten material of the bath. The device may also contain a downwardly projecting leg 42, if desired, to hold the device firmly in a fixed position.

Operation

The gas trapping and removing device 10 of this invention is installed in the hotter zones of the float chamber for it is in these hotter zones that gas bubbles are evolved from the refractory ceramic material. When installed in the bath, the first portion 26 of the device 10 is submerged in the molten bath 22 underneath the ribbon of glass 24 floating on the bath. In this position, the gas receiving pockets 30, formed in the first portion of the device, are in a facing relationship to the refractory ceramic bottom blocks 14. When gas bubbles are evolved from the refractory bottom material, the bubbles pass upwardly through the joints of the graphite blocks 18 to become entrapped in the gas receiving pockets of the device. Because of the upward incline of the gas receiving pockets, the trapped gas is fed from the first portion of the device into the gas collecting openings 34 in the second portion of the device. When the gas has reached the gas collecting opening, the gas is, in turn, directed to the gas venting opening 36 whereby it is vented to the space in which the protective atmosphere is confined above the molten material of the bath.

While in the preferred example just described, the molten material forming the bath was described as being formed of tin, the atmosphere was described as being formed of nonoxidizing gases, and the material for forming the device 10 was described as being formed from graphite, it is apparent that the only material requirements for the device are that it be constructed of a material which is compatible with the bath material and the atmosphere utilized. In other words, if different bath materials or atmospheres are utilized, it is only necessary to so select the material for forming the device such that the device will not react with the material forming the bath and also will not react with the atmosphere utilized in the chamber.

The invention disclosed will have many modifications which will be apparent to those skilled in the art in view of the teachings of this specification. It is intended that all modifications which fall within the true spirit and scope of this invention be included within the scope of the appended claims.

I claim:

1. A device for trapping and removing gas bubbles from a chamber utilized in the manufacture of glass, the chamber containing at least a refractory ceramic lining which supports thereon a molten bath over which glass may be floated to form a ribbon of glass, said trapping and removing device comprising: a block of material substantially nonreactive with the molten bath and any atmosphere contained within the chamber, said block having a first portion thereof fully submerged in the molten bath at a position located above a portion of the refractory ceramic lining, and in a position to lie spaced from and beneath the position of the edge zone of the glass ribbon said first portion of said block having a plurality of gas receiving pockets formed therein which face the refractory ceramic lining when said block is in its submerged position and which are inclined upwardly toward the side wall of the said chamber, said block of material having a second portion to which said first portion of said block is connected, said second portion of said block having gas collecting and gas venting openings formed therein interconnected with said gas receiving pockets formed in said first portion of said block.

2. The gas trapping and removing device of claim 1 further including: means for supporting said block of material in said molten bath in such a position that said first portion of said block is submerged in the bath with the gas receiving pockets thereof facing the refractory ceramic lining.

3. The gas trapping and removing device of claim 1 wherein: said first and second portions of said block are formed from one unitary piece of graphite material.

4. The gas trapping and removing device of claim 1 wherein said gas venting opening of said second portion of said block is opened to the space of the glass manufacturing chamber in which the atmosphere is confined.

5. The gas trapping and removing device of claim 1 wherein said first portion of said block has a wedge shape cross section from the free end thereof to its joinder with said second portion of said block, the lower surface of said first portion of said block being generally parallel with the upper surface of the refractory ceramic lining when said block is in an installed condition, and the upper surface of said first portion being inclined downwardly from said second portion of said block to the free end of said first portion of said block.

6. The gas trapping and removing device of claim 5 wherein said gas receiving pockets of said first portion of said block are in the form of a plurality of aligned semicircular grooves the upper surfaces of which are inclined upwardly towards said second portion of said block.

7. The gas trapping and removing device of claim 6 wherein said gas collecting opening of said second portion of said block is an opening interconnecting the ends of said plurality of grooves which terminate in said second portion of said block.

8. The gas trapping and removing device of claim 7 wherein said gas venting opening of said second portion of said block connects said gas collecting opening of said second portion of said block to the space of the glass manufacturing chamber in which the atmosphere is confined.

9. The gas trapping and removing device of claim 8 wherein said block is formed from a graphite material.

References Cited

UNITED STATES PATENTS

| | | | |
|---|---|---|---|
| 3,427,142 | 2/1969 | De Lajarte | 65—99 A X |
| 3,487,659 | 1/1970 | Ito et al. | 65—99 A |

ARTHUR D. KELLOGG, Primary Examiner

U.S. Cl. X.R.

65–99 A, 168